April 8, 1952 P. R. GOLDMAN ET AL 2,591,928
APPARATUS FOR MANUFACTURING LAMELLAR TUBING
Original Filed May 28, 1943
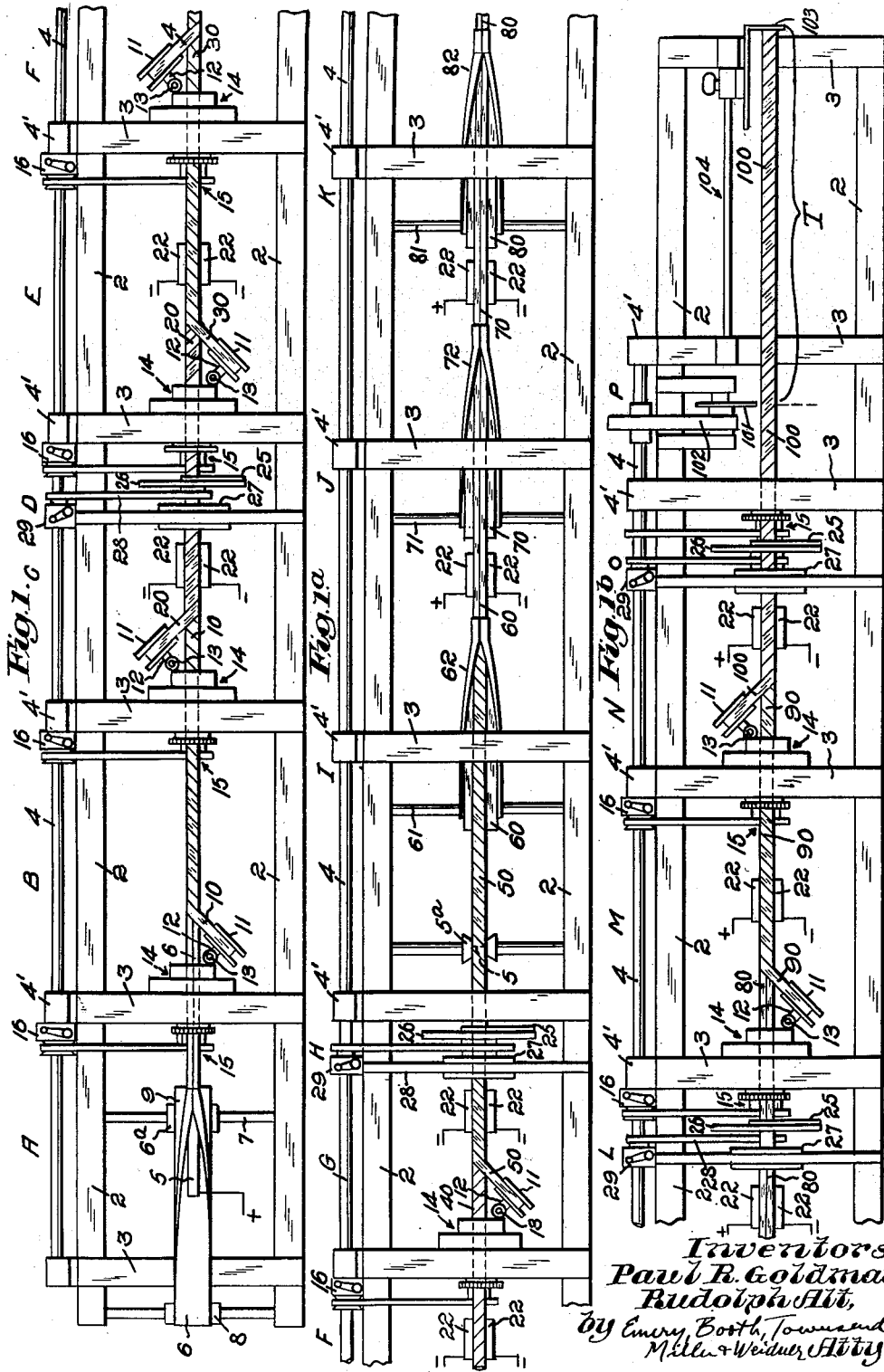
Inventors:
Paul R. Goldman,
Rudolph Alt,
By Emery, Booth, Townsend,
Miller & Weidner Attys.

Patented Apr. 8, 1952

2,591,928

UNITED STATES PATENT OFFICE 2,591,928

APPARATUS FOR MANUFACTURING
LAMELLAR TUBING

Paul R. Goldman and Rudolph Alt, Andover, Mass., assignors to Plymold Corporation, Lawrence, Mass., a corporation of Massachusetts Original application May 28, 1943, Serial No. 488,854. Divided and this application May 1, 1946, Serial No. 666,206

2 Claims. (Cl. 144—268)

This invention relates to lamellar tubing and the manufacture thereof, and aims to provide apparatus adapted for the rapid production of indeterminate continuous lengths of such tubing from wood veneer, plywood and other flexible sheet materials, and to improve tubing of that class.

This application is a division of our copending application Ser. No. 488,854, filed May 28, 1943, and now issued as Patent No. 2,402,038, dated June 11, 1946.

In the accompanying drawing illustrating somewhat diagrammatically one exemplary embodiment of the invention, Figs. 1, 1a and 1b, the two latter a continuation of Fig. 1 are a schematic showing in plan of a series of stations of a typical apparatus for forming the endless tubular product.

The apparatus as a whole makes provision for a succession of stages or phases each involving one or more operative steps, all performed along a series of independently controllable but synchronized and coordinated stations. The mechanical and electrical equipment at the various stations is disposed as an organized assembly of units distributed along a sectionalized or other suitable frame represented in the drawings as including longitudinal members 2 and cross supports 3, the construction desirably being such that units may be added or omitted as particular tubing products and uses may require. In the illustrated example some sixteen such stations or operational phases are indicated generally by the reference letters A to P, the supporting frame as a whole desirably being of a sectional character. To promote proper relative timing of all movements and phases of the apparatus as a whole the several units or sections are represented as operated from a common drive shaft 4 rotatably supported along the machine frame in suitable bearing brackets 4'.

The base or inner veneer layers which provide a core for the tubing product are developed upon an elongated cylindrical or other former or mandrel 5. This is of a length to extend at least through the initial spiral wrapping and bonding stations B and C and preferably along one or more succeeding stations, herein through station H. While in some instances a rotary mandrel may be employed, we prefer a stationary non-rotating mandrel such as here shown at 5. It accordingly may be fixedly supported at its initial or rear end in station A. Forwardly thereof it is freely supported for reception of windings of veneer, as by means of radially yieldable roller or other bearings at or between stations, as at the cross supports 3 and which in effect afford the mandrel a floating mount.

The tubular product comprising the several superposed and interbonded veneer layers or wraps is caused to progress along the non-rotated mandrel to the forward terminus thereof and thence on throughout the full length of the machine in a continuous length of indeterminate extent. As noted, the one or more inner or core wraps of the veneer preferably are spirally formed. In feeding or advancing them along and past the mandrel, any tractive or progressing action should be so applied as to avoid the tendency of opening or separating the spiral turns. Accordingly our process desirably includes a continuous supporting of the tubing by means adapted to travel with it and to distribute the progressing force along the entire length of the developing spiral tubing, in effect overlapping and bridging across between its multiplicity of spiral turns. This may be accomplished through the medium of a progresser element, feeder or carrier represented as a longitudinally continuous web or layer 6 of foldable sheet material.

This carrier is conducted from a suitable supply, along onto and about the mandrel, concentrically between it and the spiral laid veneer above-mentioned. Selected flexible sheet material of adequate tensile strength may be employed for the purpose, such for example as a fairly heavy waxed paper strip, a light-weight cotton or other fabric, web or the like including thin wood veneer and other flexible materials. A supply roll 6a of such material is rotatably mounted at or adjacent station A, as upon a bearing shaft 7, in position to be drawn upon. The carrier strip 6 from the supply passes about a guide roll 8 and forwardly through a former 9 shaped and positioned to fold the longitudinal side edges of the advancing carrier strip laterally about the mandrel 5, so as to enclose or partly enclose it. At the start of a manufacturing operation, such feeder or carrier strip 6 has its leading end threaded through the former 9 and forwardly along the mandrel 5 to or beyond the point, herein at station B, where the first veneer spiral wrapping is to be applied, such wrapping then serving to hold the strip in position about the mandrel.

At station B, a first strip 10 of thin wood veneer is spirally applied, with the succeeding veneer turns in closed or substantially closed edgewise abutting relation. Such veneer strip may be of the character as described for example in Goldman application Ser. No. 462,800, copendent with our parent application and now issued as Patent No. 2,388,479, dated November 6, 1945, extensive lengths of this strip material being prepared and supplied in roll form.

A supply roll 11 of such veneer strip or tape is rotatably mounted on an arm 12 pivoted as at 13 on a revoluble wrapper head indicated generally at 14. The latter is driven by suitable connections 15, desirably of a positive character, from the main drive shaft 4, through an interposed variable speed control device 16, affording independent adjustment and control of the speed of the wrapping operation at this station B. It will be seen that the bodily revolution of the veneer tape supply roll or drum 11 about the mandrel is effective to wind spirally onto the paper, veneer, fabric or like carrier strip 6 on the mandrel a layer of the veneer stripping having a direction of wind, indicated as right hand at station B corresponding to the direction of revolution of the wrapper head, assumed in this instance as clockwise as viewed from the rear end of the machine, at the left in Fig. 1. This initial veneer wrap 10 as at station B may be of either hand, subsequent wraps preferably being alternately opposite to the one preceding.

From station B the initial veneer layer 10 is advanced along the mandrel 5 together with the carrier web 6 whereby undesired separation of the spiral turns is avoided, to station C. There a second layer of veneer stripping 20 is spirally applied. Similar veneer wrapping mechanism is provided at station C, like parts accordingly being indicated by similar reference numerals as for station B. These include a further veneer supply roll 11 rotatable on a pivoted arm 12 and bodily revoluble with the wrapper head 14 actuated from the common drive shaft 4 through connections 15 again including a variable speed control 16. The gearing is here arranged to afford direction of revolution for the wrapper head opposite that at the preceding station B.

Attendant on the formation of the second spiral veneer wrap 20, the two initial layers 10 and 20 are united throughout their entire lengths by the medium of a plasticizable bonding agent, under the application of heat and pressure. For this purpose we employ a plasticizable thermosetting or thermo-plastic bonding agent of the synthetic or other resin type adapted for setting or polymerizing in the presence of pressure and heat. While we prefer for the purpose of phenolic cement, glue or like adhesive and impregnating agent, various materials are available, including those of the urea type and others as more fully disclosed for example in our parent application and others identified therein.

The selected bonding agent preferably is applied as a step in the preparation of the veneer strip or tape supply rolls, as a coating or a juxtaposed layer which is dried before the strip is wound into the form of a supply roll. But one layer or coat of the bonding agent generally is required between any two succeeding veneer wraps. Hence it may be carried either at the outer face of a first roll supply, such as that for station B, or at the inner face of any following roll supply, such as for station C and others subsequent. Or as to any stations except the first and last, the bonding material may be supplied at both faces of the veneer strip. The process as a whole is facilitated by thus preliminarily applying the bonding agent to the veneer strip of the supply rolls, but in some instances the agent may be applied to or inserted between the succeeding veneer layers in the course of the advance of the tubing product through the machine.

The tubular veneer layers 10 and 20, as well as the others, are caused to advance, progress or travel bodily along the forming mandrel 5 by means to be referred to later in connection with station D and others; in the course of this travel the veneer layers are subjected to heat and pressure so calculated and timed with respect to the particular bonding agent employed as to set or polymerize the same at least adequately to afford the progressing tubular structure a self-sustaining integral character. That is, the veneer layers to be joined such as 10 and 20 of stations B and C receive a heat and pressure treatment such that upon their arrival at a next station they are sufficiently firmly set to receive a further superposed veneer layer without likelihood of being deformed, separated or otherwise disturbed by the latter. This polymerizing, setting and drying of the bonding agent need not be wholly complete or final between successive wrapping stations and generally may be continued and supplemented in the course of similar treatment of succeeding layers, so that at the delivery station P a completed tubing product is endlessly delivered, subject to such, if any, buffing, coating or other finishing treatment as may be desired in a given case.

While the heating and pressure treatment may be variously accomplished, we have found particularly adapted to the purposes of our process a treatment involving the application of electric energy either of the high-frequency or radio-frequency character or as utilized in electrical resistance heating. Accordingly we have herein diagrammatically indicated in association with station C, and various subsequent stations, means whereby the bonding agent is subjected to heat created by high-frequency or radio-frequency current while simultaneously the layers to be bonded are placed under pressure tending to compact and unify them. Heating of the character referred to, sometimes termed diathermic, may be in general such as described for example in British Patent No. 310,925, U. S. Patents Nos. 1,813,425 and 1,900,573 and others such as 2,087,480 and 2,173,622.

Such heating and pressure means as here diagrammatically shown includes one or more rolls 22 mounted for rotatable pressing engagement upon and around the outer surface of the then outer or second veneer wrap 20, in opposition to the mandrel 5 utilized as a former or die. These pressure rolls 22 or their surface portions are of metal or other conductive material suitably insulated from their supporting means. They are simultaneously utilized as electrodes, being connected in circuit with one side, either positive or negative, of a source of high-frequency or radio-frequency current, as indicated diagrammatically at station C. The other electrode is as herein shown presented by the mandrel 5 itself, the latter being insulated from its bearing supports and being connected with the other side of the current supply, as for example the positive side as indicated at station A.

Passage of the high-frequency current between the pressure rollers and the mandrel as at station C acts to heat and polymerize the bonding agent between the two concentric veneer wraps 10 and 20, creating the heat largely in or closely adjacent the bonding matter itself, with a penetrative action and in such manner that any injurious effect on the veneer is avoided. The roller pressure-electrode elements 22 are of sufficient extent axially of the forming tubing to apply the desired heat and pressure over a substantial length of the tubing, adequate to accomplish the setting and drying of the bonding agent during the timed progress of the tubing beyond station C. Said elements may comprise a single elongated set or a series of successive sets distributed along the tubing.

It will be evident that the polymerizing time for the particular bonding agent employed is a main factor in determining the rate of advancing travel for the forming tubular structure. The several operational stations are so arranged and correlated, and the rate of travel of the tubing product is so timed that in the course of progress from one wrapping or layer-applying station or point to the one next succeeding the bonding agent is at least partially polymerized, to the unifying extent as previously described, adequately to render the product substantially self-supporting or form-retaining, as to each succeeding veneer layer and as to the accumulating unified plurality thereof as a whole.

At station D we have represented schematically a progressing or advancing means as particularly appropriate in association with the assumed stationary and non-rotating mandrel 5. It comprises as a main element an endless flexible band or feeder belt 25. One or more full turns of this belt are applied directly around and in gripping engagement with the outer surface of the tubing 10—20. The belt also passes over one or more carrier pulleys on a revoluble head or plate 26 having a supporting sleeve bearing 27 surrounding and concentric with the tubing but spaced from it. This head 26 is driven through suitable connections 28 from the main drive shaft 4, again through a variable speed control unit 29.

The feeder belt 25 as stated has one or more full turns, in side-by-side relation, around the tubing, where it accordingly presents a spiral or screw-like gripping formation. Revolution of the belt as a whole, while the belt itself is kept taut between its carrier pulley and engaged tubing, produces a similar effect upon the latter as if the tube-gripping portion were in fact a screw being turned on the tubing but held against travelling along it. Since similarly the belt, being positioned in the axial direction by its supporting head 26, cannot progress along the tubing, the latter itself is forced to progress at a rate determined by the speed of revolution of the belt and head 26. This rate of feeding or progressing movement thus supplied to the tubing may be accurately controlled and regulated through the medium of the speed control 29. In this connection the function of the paper or other flexible carrier web 6 will be appreciated. Since this tubular or partly tubular carrier layer is subject to the gripping action of the progressing means a major portion of the advancing force is received by it rather than by the veneer layers while they are being dried and set. The carrier web, which may be continued throughout the entire length of the tubing, serves as a longitudinal tie or bridging connection between the various spiral turns of the tubing, relieving them of any tendency to be separated. Since in actual practice the required feeding effort axially is relatively slight, a carrier web of ordinarily fairly heavy waxed paper generally is found adequate for the purpose.

Beyond the progressing or feeding station D any desired number of additional spiral applications of veneer stripping are made. We have herein represented by way of example a further series of three stations E, F and G, each of which may be substantially similar as already described in connection with stations B and C, including heat and pressure means as exemplified at the latter station. The direction of wind is alternated, the several wrapping heads and their drive connections, the latter again including speed control devices 16, being such as to afford the desired reversal of lay and overlapping of edge juncture in successive layers. In the illustrated example a right lay 30 is indicated at station E, over the preceding left lay 20 at station C, and followed by left and right wraps 40 and 50 respectively at stations F and G. Heat and pressure treatment adequate for at least partial polymerizing of the bonding agent desirably is applied at each of these stations, similarly for example as explained in connection with station C. Thus it is evident that the operation at or in association with each stage or station is sufficiently complete to render the strip there served and applied to the work substantially self-sustaining or form-retaining, that is, each veneer wrap or layer is subject to a heat and pressure setting or polymerizing treatment prior to the serving and laying of the superposed layer next succeeding. In this manner a tubing product of maximum strength and rigidity, particularly in the radial direction as desired for the inner or core element of the tubing, is produced.

At station H we have indicated another progressing or advancing means 25 to 29. This may be such as previously described in connection with station D. Depending on the particular characteristics, as to weight, wall thickness, and strength desired for the given tubing product, any plurality of the alternately opposite spiral veneer windings may be employed. The apparatus as here shown by way of illustration makes provision for five inner or core spiral-formed layers, which plurality is upon the average found to be sufficient in the greater number of instances, for tubing up to diameters of 3 to 5 inches or more. If additional inner wraps are desired other wrapping stations may be inserted. Conversely, if a less number of core veneer layers are required, any one or more of the stations C, E, F or G may be rendered inoperative, the corresponding wrapping head 15 being temporarily disconnected as by a zero setting of the speed control or through suitable clutch mechanism.

The forming mandrel 5 is extended through the successive wrapping stations from station A to a stage such as to insure adequate support for the forming core. In the diagrammatic showing of Figs. 1, 1a, this mandrel 5 is continued through and terminates shortly beyond station H, as indicated by the dotted line and the numeral 5 on Fig. 1a. As previously noted, the mandrel in this instance is stationary and non-rotating, while the developing tubing product is progressed along the mandrel by means such as described, the tube not being rotated on its own axis but merely advanced lineally. Beyond the forward end of the mandrel 5, at succeeding stages or stations of the process, the resin-bonded cylindrical core or tube element itself is utilized as a mandrel for the application of the intermediate and final layers of veneer. In the illustrated example this bonded core or inner element of the tubing product comprises some five veneer layers laid spirally and alternately of the opposite hand, the particular plurality of such layers being selected as appropriate for the given tubing product.

The progressing tubular core element on continuing its advance beyond station H comes next to a station I. Here a veneer strip 60 desirably having the grain disposed lengthwise the strip is superposed on the core by laying it in the axial or longitudinal direction. Such veneer strip 60 is drawn from a prepared roll supply rotatably supported as upon a cross shaft 61. The strip from such supply is led lengthwise beneath the tubing core and into and through a former or folding die 62. The latter serves to fold the lengthwise-grained strip circumferentially of the tubing core now serving as a mandrel, the strip being of the appropriate width such that its longitudinal side edges are brought into close abutting but preferably non-overlapping relation, substantially as illustrated. The described laying and lateral wrapping of this longitudinal strip is accomplished by and in the course of the continuing forward progress of the tubing as a whole.

The veneer strip 60 carries or is supplied with a bonding agent similarly as described in connection with the preceding stations and in the course of the progress of the tube at station I it is subjected to heat and pressure desirably through the medium of pressure rolls 22, 22, as at the preceding stations. In this instance, and the same applies as to all following stations, diametrically opposed pairs of the rolls 22 are disposed in circuit to receive the heating current, as indicated by the plus and minus symbols on the drawing; that is, a pair of the rolls are utilized as the two electrodes of opposite polarity in lieu of employment of the interior mandrel 5 as one electrode.

In some instances, but a single longitudinally applied strip such as 60 may be employed, but generally a plurality of two or more are desirable, to provide a calculated axial strength and rigidity for the tubing product in combination with the underlying spirally laid and predeterminedly radially rigid core layers. In the example of the accompanying diagrammatic illustration, two such further applications of lengthwise stripping 70 and 80 are provided for, at the stations J and K respectively. In all major respects the procedure at these stations may be similar as at station I, the roll supplies of prepared lengthwise-grained veneer stripping being rotatably supported on shafts 71, 81, and the succeeding strips 70 and 80 being conducted through folding or forming dies 72 and 82 respectively. The progressing tube again is subjected to a heat and pressure treatment at each station, as by means of the indicated electrode rolls 22, whereby each individual longitudinal layer of the veneer is individually as well as progressively polymerized, set and dried.

At any convenient points with respect to the several veneer laying stations, additional progressing stations are provided, one of which is indicated at station L. The progressing or advancing means here may be similar to that as described in connection with preceding stations D and H, including the progresser belt mechanism 25 and a speed control 29.

Following application and setting of selected one or more lengthwise laid veneer strips as at stations I, J and K, one or more outer or cover veneer layers are applied, these generally being laid spirally similarly as at the core layer stations B, C, E, F and G. In the example as illustrated, two such final spiral layers 90 and 100 are applied at stations M and N respectively, these being laid of the opposite hand, indicated as right and left respectively at said stations M and N. At each of these latter stations or stages the tubing is subjected to a heating and pressure treatment for the polymerizing of the bonding agent as previously described, pressure electrode rollers 22, 22 being indicated for the purpose on the drawing.

A final progressing station is represented at O. This may be understood as similar to that as explained in connection with preceding stations D, H and L.

The continuous forward progress of the tubing product beyond station O brings it to the severing and delivery station such as diagrammatically represented at P. Automatic or other means is here provided for cutting off the continuous tubing product of indeterminate length into sections of any length, as may be desired for the given product and its use. At the station P a selected length of the finished tubing product is indicated as a whole by the numeral T. It is adapted to be severed as by a swinging rotary cutter 101 operated from the common drive shaft 4 through drive connections indicated as a whole at 102. For controlling the cutting time and point an automatic and adjustable length gauge 103 may be provided at the leading end of the tubing T, the same being movably supported and adapted to serve as a trip or stop, through connections as indicated generally at 104. Advancing engagement of the leading end of the tubing T against the trip or gauge 103 thus automatically brings the cutter 101 into operation, causing it to swing across the path of the tubing to sever the selected length thereof, the cutter mechanism being of the timed progress type and synchronized with the progress of the tubing product so as to travel in synchronism with the latter during a cutting operation without interrupting or disturbing the continued forward progress of the following length of the tubing.

If preferred to rotate the mandrel and the tubing formed upon it, this may be accomplished within the scope of the invention by revolving the alternately oppositely laid veneer roll supplies about the tube and mandrel at twice the speed of rotation of the latter. The apparatus as disclosed provides for timing of the progress of the tubing and of the laying of the various veneer layers to conform them to the required time interval for the polymerization of the bonding agent at each station, this in turn being made possible by polymerizing the tube during its processing at each station under a heat and pressure treatment such as described. The invention includes the novel adaptation to this end of penetrative heating by electric energy whether of the high-frequency or radio-frequency character or of the transformer or resistance type and wherein at times a mandrel serves as an electrode in cooperation with outside pressure rollers or other members, or such members in opposed pairs presenting both electrodes. Through the progressive edge-turning or lateral wrapping, inturning or folding through folding dies as utilized for the length-grain veneer layers or plies or for the paper, veneer or other carrier strip 6, the rate of application thereof may be coordinated with the other phases including both the inner or core stages and the exterior or cover stages, all in the synchronized, automatic and continuous procedure afforded by the apparatus as herein illustrated and described by way of example.

Our invention is not limited to the particular embodiment thereof as shown or described herein, its scope being pointed out in the following claims.

We claim:

1. Apparatus for the manufacture of plural-ply wood tubing comprising in combination, an elongated frame having initial, intermediate and delivering sections defining a work path and presenting along it a plurality of stations in predetermined spaced relation, a forming mandrel extending longitudinally through and between an initial plurality of said stations, revoluble head means at the respective initial stations for spirally wrapping individual supplies of veneer stripping in superposed tubular relation about the mandrel in different wind directions at different stations, work-engaging means for continuously progressing the tubular work axially along the mandrel, veneer strip applying means at a succeeding station for supplying a veneer strip longitudinally to and laterally wrapping it about the spirally wrapped veneer layers, further spiral wrapping means at a station subsequent to the longitudinal strip supplying station, and drive mechanism for the wrapping and the progressing means coordinated to present the resultant endless veneer tubing continuously at the delivering section of the frame.

2. Wood-veneer tubing apparatus comprising, in combination, a stationary forming mandrel, an initial plurality of oppositely rotating heads each having means for rotatably supporting a roll supply of veneer stripping and wrapping the same spirally in closed tubular form about the mandrel, revoluble flat surfaced means for externally engaging and continuously advancing the tubular work, an intermediate plurality of longitudinal forming means disposed in immediate succession and positioned to deliver a veneer strip longitudinally and to wrap it laterally about the advancing tubular work, a support for a veneer strip supply associated with each said means, a final plurality of revolving heads similar to the initial heads for wrapping a corresponding number of spiral veneer strips about the longitudinally laid and laterally wrapped strips, and means for applying heat and pressure to each intermediate and final veneer strip immediately following the wrapping thereof thereby to integrate it to that preceding by heat and pressure treatment of bonding material between them, said heat and pressure applying means disposed in immediately following succession to said intermediate forming and said final wrapping means.

PAUL R. GOLDMAN.
RUDOLPH ALT.

REFERENCES CITED

The following references are of record in the file of this patent:

UNITED STATES PATENTS

| Number | Name | Date |
|--------|------|------|
| 616,044 | Wilson | Dec. 13, 1898 |
| 945,862 | Osborn | Jan. 11, 1910 |
| 964,162 | Jenkins | July 12, 1910 |
| 1,883,401 | Rolfs | Oct. 18, 1932 |
| 1,932,942 | Thordarson | Oct. 31, 1933 |
| 2,033,717 | Kopetz | Mar. 10, 1936 |
| 2,296,781 | Farny | Sept. 22, 1942 |
| 2,321,738 | Farny | June 15, 1943 |
| 2,336,540 | Graves | Dec. 14, 1943 |
| 2,351,692 | Miller | June 20, 1944 |
| 2,382,834 | Tynan | Aug. 14, 1945 |
| 2,392,194 | Seymour | Jan. 1, 1946 |
| 2,402,040 | Goldman | June 11, 1946 |
| 2,413,816 | Evert | Jan. 7, 1947 |